(12) United States Patent
Tong et al.

(10) Patent No.: US 8,797,993 B2
(45) Date of Patent: Aug. 5, 2014

(54) METHOD AND DEVICE FOR SUPERIMPOSING REFERENCE SIGNAL AND DATA BASED ON SPACE DIVISION MULTIPLE ACCESS

(75) Inventors: Hui Tong, Beijing (CN); Ming Xu, Beijing (CN); Masayuki Hoshino, Kanagawa (JP); Seigo Nakao, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 252 days.

(21) Appl. No.: 13/378,124

(22) PCT Filed: Apr. 12, 2010

(86) PCT No.: PCT/CN2010/071684
§ 371 (c)(1),
(2), (4) Date: Dec. 14, 2011

(87) PCT Pub. No.: WO2010/145276
PCT Pub. Date: Dec. 23, 2010

(65) Prior Publication Data
US 2012/0127952 A1    May 24, 2012

(30) Foreign Application Priority Data

Jun. 19, 2009  (CN) .......................... 2009 1 0147783

(51) Int. Cl.
*H04W 4/00*      (2009.01)
*H04B 7/04*      (2006.01)

(52) U.S. Cl.
CPC ..................................... *H04B 7/046* (2013.01)
USPC ............ 370/330; 370/338; 370/341; 370/348

(58) Field of Classification Search
CPC ........................................................ H04B 7/046
USPC .......... 370/328, 330, 338, 342, 341; 455/450, 455/501, 507
See application file for complete search history.

(56) References Cited

U.S. PATENT DOCUMENTS

| 8,437,787 | B2 * | 5/2013 | Shimonabe et al. | .......... 455/507 |
| 2007/0248113 | A1 | 10/2007 | Ko et al. | |
| 2009/0011767 | A1 * | 1/2009 | Malladi et al. | ................ 455/450 |
| 2009/0286562 | A1 * | 11/2009 | Gorokhov | ..................... 455/501 |

FOREIGN PATENT DOCUMENTS

| CN | 101421958 A | 4/2009 |
| CN | 101447815 A | 6/2009 |
| WO | 2007149722 A1 | 12/2007 |

OTHER PUBLICATIONS

3GPP TSG RAN WG1 Meeting #57, San Francisco, USA May 4-8, 2009, "Further Discussion on Enhanced DL Beam-forming", Samsung, R1-091864.
International Search Report for PCT/CN 2010/071684 dated Jul. 8, 2010.

* cited by examiner

*Primary Examiner* — Brian D Nguyen
*Assistant Examiner* — Toan Nguyen
(74) *Attorney, Agent, or Firm* — Pearne & Gordon LLP

(57) ABSTRACT

The present invention provides a method of superimposing data signals and reference signals in a space division multiple access communication system, a base station of the communication system transmitting the first layer resource block and another layer resource block to a terminal using the same time/frequency resources, reference signals in the first layer resource block and reference signals in the other layer resource block being orthogonal to each other, the method including superimposing data signals transmitted in the first layer resource block at positions of reference signals in the first layer resource block, making a spreading sequence of the superimposed data signals orthogonal to a spreading sequence of the reference signals in the first layer resource block. The present invention can effectively use resources consumed under a multiuser MIMO system and drastically improve the system performance.

17 Claims, 13 Drawing Sheets

METHOD AND DEVICE FOR SUPERIMPOSING REFERENCE SIGNAL AND DATA BASED ON SPACE DIVISION MULTIPLE ACCESS

TECHNICAL FIELD

The present invention relates to multiantenna signal transmission in a communication system based on space division multiple access, and more specifically, to a method and apparatus for superimposing reference signals and data signals based on space division multiple access.

BACKGROUND ART

In current radio communication systems, it is widely recognized that multi-input multi-output (MIMO) systems are a scheme effective in increasing throughput of a system. Among such MIMO systems, multiuser MIMO can more effectively increase system performance than single user MIMO. The multiuser MIMO is regarded as a further enhancement of the single user MIMO. In a successor version of the current Long-Term Evolution (LTE) system, studies are being carried out on the expansion of the current dual-layer beamforming (DL-BF) technique from single user to multiuser. In Rel-9, the multiuser MIMO can use a design similar to DL-BF of the single user MIMO. The multiuser MIMO is different from the single user MIMO in that data streams of different layers are transmitted to different users.

FIG. 1 shows a system that transmits two data streams to one user. As shown in FIG. 1, a plurality of antennas of cell base station 100 transmit two data streams after modulation, that is, a first layer data stream and a second layer data stream, to user 101.

FIG. 2 shows a system that transmits two data streams to two different users. As shown in FIG. 2, a plurality of antennas of cell base station 200 transmit two modulated data streams, that is, a first layer data stream and a second layer data stream, to two different users, that is, a first user and a second user. One outstanding feature of multiuser is that when a system scheduler and precoding vector are normally designed, intensities of data signals and reference signals (RS) of some layers are relatively high and intensities of data signals and reference signals of the other layers are relatively low on a receiving antenna of a certain user (e.g., 10 dB or lower).

The Rel-9 version defines that in single user DL-BF, reference signals are orthogonal to each other between two layers. Taking into account the fact that multiuser is an expansion of single user, reference signals of the plurality of users in a multiuser beamforming system must also be orthogonal to each other and an orthogonal scheme thereof may be time division multiplexing (TDM), frequency division multiplexing (FDM) or code division multiplexing (CDM).

SUMMARY OF INVENTION

Technical Problem

In multiuser beamforming, intensities of reference signals of other layers received by a user are relatively small, but reference signals of the other layers still occupy orthogonal resources of the main layer. For this reason, these orthogonal resources are not used to the full.

Solution to Problem

The present invention has taken into account the above-described problems.

One aspect of the present invention provides a method of superimposing data signals and reference signals in a space division multiple access communication system, a base station of the communication system transmitting a first layer resource block and another layer resource block to a terminal using the same time/frequency resources, reference signals in the first layer resource block and reference signals in the other layer resource block being orthogonal to each other, and the method including superimposing data signals transmitted in the first layer resource block at positions of reference signals in the first layer resource block, making a spreading sequence of the superimposed data signals orthogonal to a spreading sequence of the reference signals in the first layer resource block.

According to the above-described aspect of the present invention, the reference signals employ a code division multiplexing scheme, the reference signals in the first layer resource block and the reference signals in the other layer resource block occupy the same time/frequency positions and use different orthogonal spreading sequences.

According to the above-described aspect of the present invention, the spreading sequence of the superimposed data signals is the same as the spreading sequence of the reference signals in the other layer resource block.

According to the above-described aspect of the present invention, the spreading sequence of superimposed data signals is orthogonal to the spreading sequence of reference signals in the other layer resource block.

According to the above-described aspect of the present invention, the spreading sequence of superimposed data signals includes a long spreading sequence and a short spreading sequence, the long spreading sequence is orthogonal to the spreading sequence of reference signals in the first layer resource block and the other layer resource block and the short spreading sequence is orthogonal to only the spreading sequence of reference signals in the first layer resource block.

According to the above-described embodiment of the present invention, the same power is allocated to each data signal and relatively high power is allocated to each reference signal.

According to the above-described aspect of the present invention, the spreading sequence of superimposed data signals includes a short spreading sequence, a long spreading sequence and a longer spreading sequence.

According to the above-described aspect of the present invention, the power of data signals spread using the relatively long spreading sequence is lower than the power of data signals spread using the relatively short spreading sequence.

According to the above-described aspect of the present invention, the spreading sequence is a Hadamard-Walsh sequence.

According to the above-described aspect of the present invention, the terminal is a plurality of terminals and resource blocks received by different terminals are resource blocks of different layers.

According to the above-described aspect of the present invention, the terminal is one terminal and the one terminal receives resource blocks of different layers.

According to the above-described aspect of the present invention, the reference signals employ a frequency division multiplexing or time division multiplexing scheme and the method further includes a step of superimposing data signals at positions of the first layer resource block corresponding to reference signals of the other layer resource block.

According to the above-described aspect of the present invention, data signals superimposed at positions of the first layer resource block corresponding to reference signals of the other layer resource block employs a spreading sequence orthogonal to a spreading sequence of reference signals of the other layer resource block.

According to the above-described aspect of the present invention, when the length of a spreading sequence is greater than 2, a plurality of pieces of data can be superimposed at the same time/frequency positions of the first layer resource block. Another aspect of the present invention further provides an apparatus that superimposes data signals and reference signals in a space division multiple access communication system, the apparatus being arranged in a cell base station, including a superimposing apparatus that superimposes data signals transmitted in a first layer resource block at positions of reference signals in the first layer resource block and makes a spreading sequence of the superimposed data signals orthogonal to a spreading sequence of reference signals in the first layer resource block, wherein the cell base station transmits the first layer resource block and another layer resource block to a terminal using the same time/frequency resources.

A further aspect of the present invention provides a method of superimposing data signals and reference signals in a space division multiple access communication system, a base station of the communication system transmitting a first layer resource block and another layer resource block to a terminal using the same time/frequency resources, reference signals in the first layer resource block being orthogonal to reference signals in the other layer resource blocks, the method including superimposing data signals transmitted in the first layer resource block at positions of the first layer resource block corresponding to positions of reference signals of the other layer resource block.

The above-described embodiment of the present invention further includes a step of the superimposed data signals employing a spreading sequence orthogonal to the spreading sequence of reference signals of the other layer resource block.

According to the above-described embodiment of the present invention, when the length of the spreading sequence is greater than 2, a plurality of pieces of data can be superimposed at the same time/frequency positions.

Advantageous Effects of Invention

The present invention can effectively use resources consumed under a multiuser MIMO system, cause effective data signals of the main layer to be superimposed on reference signals and the superimposing scheme can effectively control interference of superimposed data with other layers and drastically improve the system performance.

BRIEF DESCRIPTION OF DRAWINGS

From the following detailed descriptions combining drawings and embodiments of the present publication, these embodiments and/or other embodiments and advantages of the present publication will be made clearer and more understandable, where.

DESCRIPTION OF EMBODIMENTS

Figure 1:
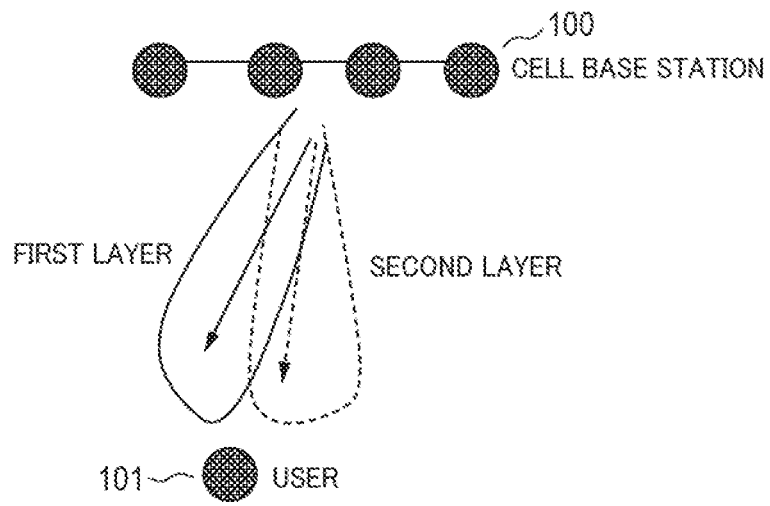
FIG. 1 is a diagram illustrating a system that transmits two data streams to one user.

Hereinafter, embodiments of the present invention will be described in detail by combining the accompanying drawings. Considering detailed descriptions for several related arts might make the gist of the present invention ambiguous, hence detailed descriptions thereof will not be presented here. In respective embodiments, elements or means for executing the same function will be shown using the same reference numerals assigned thereto.

The present invention takes into account a space division multiple access communication system that superimposes data signals transmitted in a first layer resource block at positions of reference signals in the first layer resource block and a spreading sequence of superimposed data signals is made to be orthogonal to the spreading sequence of the reference signals in the first layer resource block. As a matter of course, the superimposed data signals have the potential for causing interference with reference signals of other layers, and therefore the level of interference needs to be controlled. In a situation of space division multiple access, interference of these data signals with reference signals of the other layers can be controlled to within an allowable range, for example, on the order of 10 dB.

Figure 2:
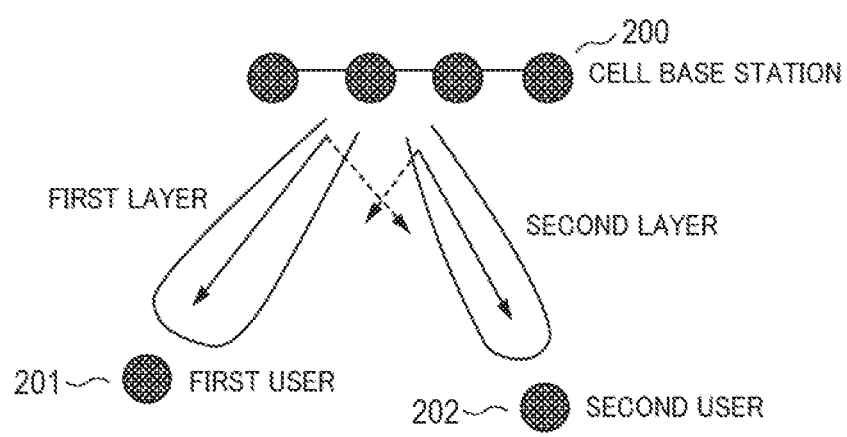
FIG. 2 is a diagram illustrating a system that transmits two data streams to two different users.

An application environment of the present invention is a communication system based on space division multiple access and an illustrative communication system shown in FIG. 2 includes cell base station 200 and a plurality of user apparatuses that communicate with cell base station 200 (e.g., first user 201 and second user 202). Here, FIG. 2 shows only two users 201 and 202, but the number of users does not limit the scope of the present invention and the embodiments of the present invention can include an arbitrary plurality of users. Based on an embodiment of the present invention, suppose the user apparatus here is a mobile apparatus such as a mobile phone, PDA, portable computer.

As described above, a plurality of antennas of cell base station 200 shown in FIG. 2 transmit two modulated data streams, that is, a first layer data stream and a second layer data stream to two different users, that is, first user 201 and second user 202. Here, intensities of data and reference signals (RS) of the first layer data stream transmitted to first user 201 on a receiving antenna of first user 201 are relatively high and intensities of data and reference signals of the second layer data stream transmitted to second user 202 are relatively low. Here, each layer data stream includes a plurality of continuous resource blocks.

Figure 3A:
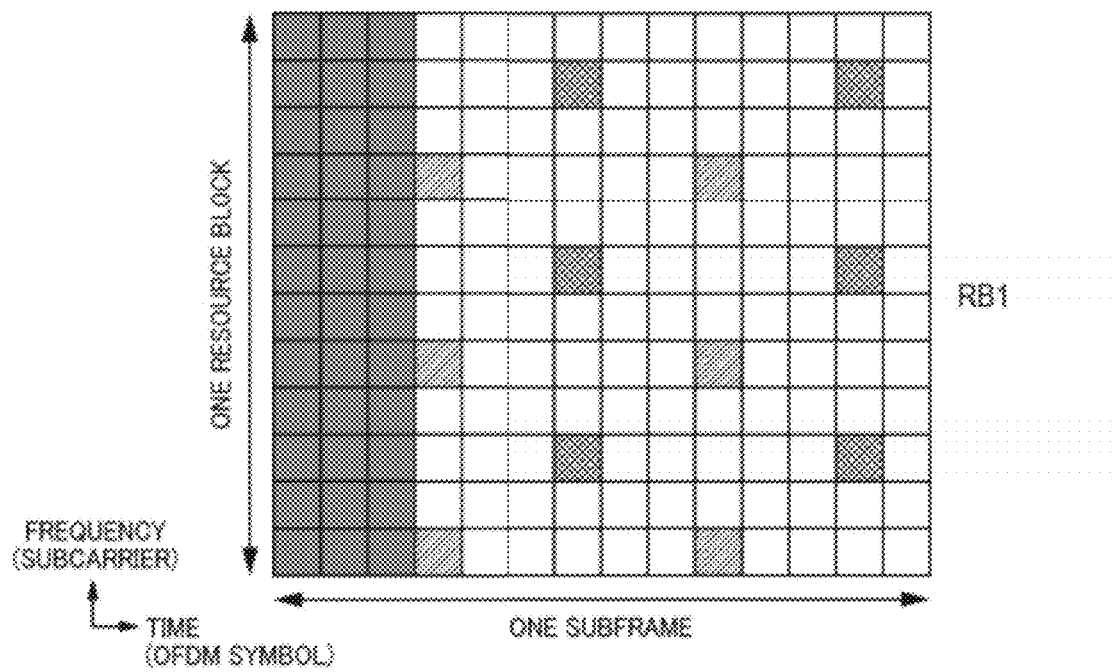
FIG. 3(a) and FIG. 3(b) are diagrams illustrating an example of a resource block making up a data stream.
Figure 3B:
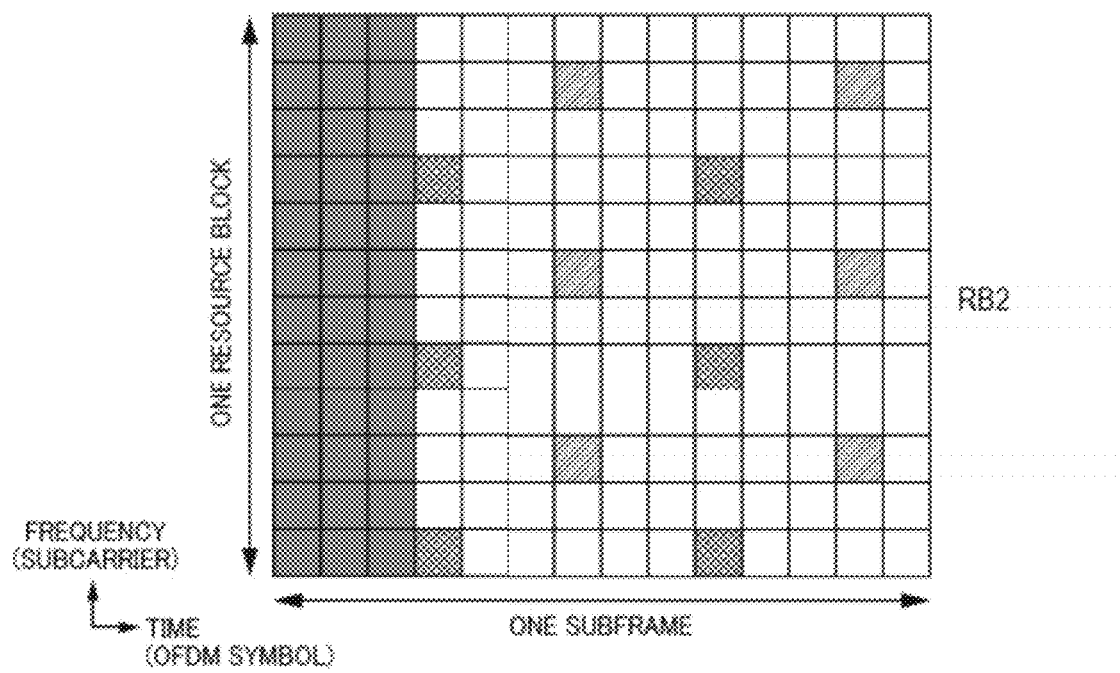

FIG. 3(a) and FIG. 3(b) are diagrams illustrating an example of a resource block making up a data stream.

FIG. 3(a) shows one resource block making up the first layer data stream. In the figure, the horizontal axis of the resource block shows time and the vertical axis shows a frequency bandwidth. The horizontal axis is divided into 14 steps and each step extends in the vertical axis direction to make up one OFDM symbol starting from the horizontal axis. The vertical axis is divided into 12 steps and each step makes up one subcarrier that extends in the horizontal axis direction starting from the vertical axis. Each cell in the resource block represents one resource element. All 12×14 resource elements in the resource block make up one subframe on the horizontal axis. Resource elements of front three columns of the resource block make up a control region and are corresponding to transmission of control data. Other non-colored resource elements are used to transmit data signals. Demodulation reference signals (DM-RS) used for cell-specific transmission in resource elements shown by hatch lines are used to demodulate data signals transmitted in the resource block in a user terminal. Six reference signals are included in each resource block and distributed at predetermined positions. The number and positions of reference signals do not limit the scope of the present invention and an appropriate number of reference signals may be arranged at appropriate positions according to requirements of the system.

The first layer data stream received by first user 201 from cell base station 200 is made up of a plurality of continuous resource blocks on the time and frequency axes and each resource block is simply a signal transmitted for a certain time (e.g., time t1 to time t2) and in one frequency band (e.g., frequency f1 to frequency f2).

FIG. 3(b) shows one resource block making up a second layer data stream. The resource block shown in FIG. 3(b) and the resource block shown in FIG. 3(a) have the same structure and therefore descriptions thereof will be omitted here. The second layer data stream received by second user 202 from cell base station 200 is also made up of a plurality of continuous resource blocks on the time and frequency axes.

The reference signals shown in FIG. 3(a) and FIG. 3(b) adopt a modulation scheme such as time division multiplexing or frequency division multiplexing. The reference signals in first layer resource block RB1 and reference signals in second layer resource block RB2 are located at different time/frequency positions. That those reference signals occupy different resource elements. In a situation in which first layer resource block RB1 and second layer resource block RB2 are in the same time zone (e.g., from time t1 to time t2) and in the same frequency band (e.g., from frequency f1 to frequency f2) (that is, belonging to the same time/frequency resources), as shown by resource elements indicated by cross-hatch lines, puncturing is performed at positions of first layer resource block RB1 corresponding to the reference signals of second layer resource block RB2 and no signal is transmitted at the punctured positions. Similarly, as shown by resource elements indicated by cross-hatch lines, puncturing is performed at positions of second layer resource block RB2 corresponding to the reference signals of first layer resource block RB1 and no signal is transmitted at the punctured positions. This makes the reference signals of first layer resource block RB1 orthogonal to the reference signals of second layer resource block RB2.

Figure 4A:
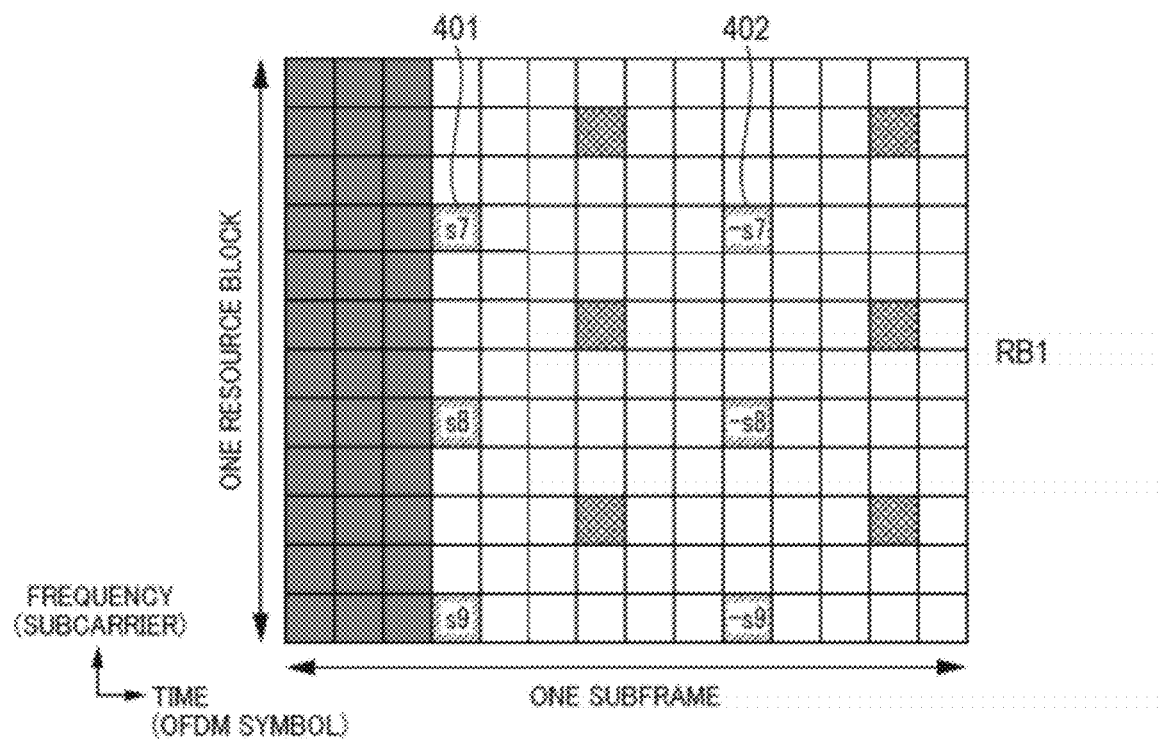
FIG. 4(a) and FIG. 4(b) are diagrams illustrating a method of superimposing reference signals and data signals based on an embodiment of the present invention.
Figure 4B:
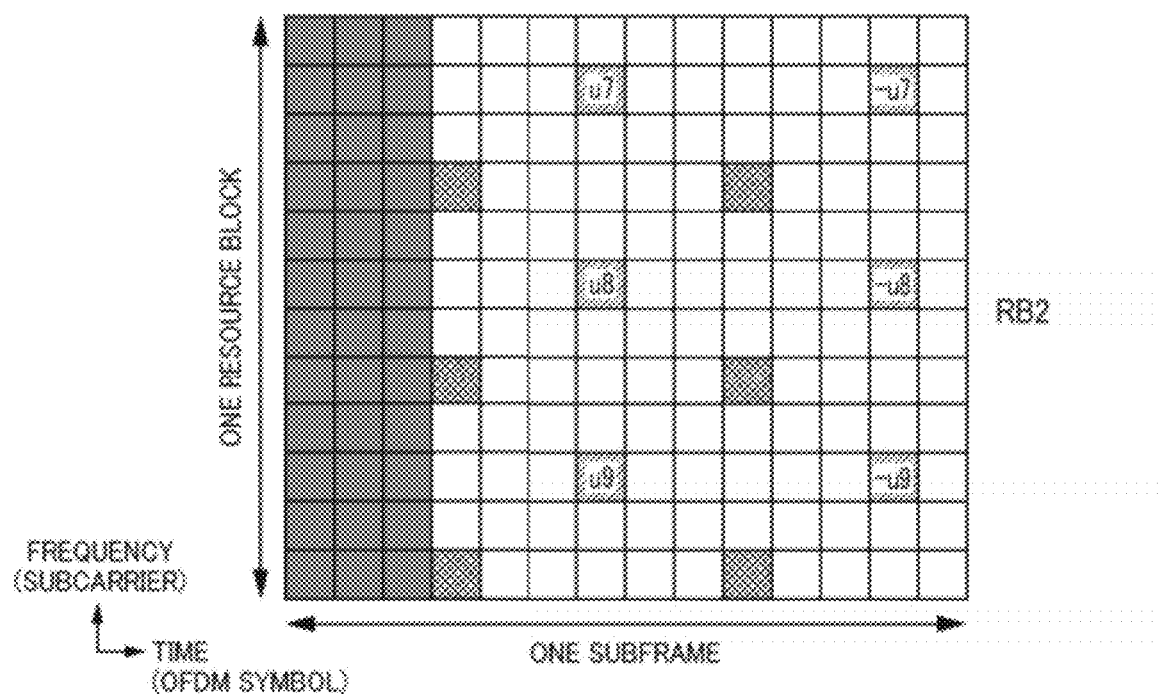

FIG. 4(a) and FIG. 4(b) are diagrams illustrating a method of superimposing reference signals and data signals based on an embodiment of the present invention.

FIG. 4(a) shows a method of superimposing data signals on reference signals of first layer resource block RB1 in a situation in which reference signals employ a modulation scheme such as time division multiplexing or frequency division multiplexing. That is, data signals transmitted on first layer resource block RB1 are superimposed at positions of the reference signals in first layer resource block RB1 and a spreading sequence of superimposed data signals is orthogonal to a spreading sequence of reference signals in first layer resource block RB1. As shown in FIG. 4(a), data signals s7, −s7, s8, −s8, s9 and −s9 are also superimposed at positions (shown by hatch lines) of reference signals of first layer resource block RB1. Since reference signals of the main layer (first layer) cannot be spatially separated from data signals superimposed on the main layer (first layer), the superimposed data needs to be spread by employing a spreading sequence orthogonal to the spreading sequence of reference signals of the main layer. Assuming that the spreading sequence of reference signals of first layer resource block RB1 is [1,1,1,1,1,1], the spreading sequences of three superimposed data signals s7, s8 and s9 are [1,−1], [1,−1] and [1,−1] and each spreading sequence is orthogonal to the spreading sequence of reference signals [1,1,1,1,1,1]. Here, the superimposed data signals employ a code division multiplexing-like modulation scheme.

Thus, the terminal that receives the aforementioned resource block can obtain the superimposed data signals through appropriate calculations. Superimposed data signal s7 is obtained, for example, by subtracting a signal transmitted by resource element 402 from a signal transmitted by resource element 401 and further dividing the subtraction result by 2. As shown in FIG. 4(a), when each layer resource block transmits reference signals by employing six resource elements, it is possible to superimpose further three data signals on the resource block of each layer using such a method. This makes it possible to increase the resource block transmission efficiency.

FIG. 4(b) shows a method of superimposing data signals on reference signals of second layer resource block RB2 in a situation in which reference signals employ a modulation scheme of time division multiplexing or frequency division multiplexing. That is, data signals transmitted on second layer resource block RB2 are superimposed at positions of the reference signals in second layer resource block RB2 and a spreading sequence of superimposed data signals is orthogonal to a spreading sequence of reference signals in second layer resource block RB2. As shown in FIG. 4(b), data signals u7, −u7, u8, −u8, u9 and −u9 are superimposed at positions of reference signals of second layer resource block RB2 respectively. Assuming that the spreading sequence of reference signals of second layer resource block RB2 is [1,1,1,1,1,1], the spreading sequences of three superimposed data signals u7, u8 and u9 are [1,−1], [1,−1] and [1,−1] and each spreading sequence is orthogonal to the spreading sequence of the spreading sequence of reference signals [1,1,1,1,1,1]. Here, the superimposed data signals employ a code division multiplexing-like modulation scheme.

Similarly, the terminal that receives the aforementioned resource block can obtain the superimposed data signals through appropriate calculations. As shown in FIG. 4(b), when one resource block of each layer transmits reference signals by employing six resource elements, it is possible to superimpose further three data signals on resource block RB2 of the second layer using such a method. This makes it possible to increase the resource block transmission efficiency.

Figure 5A:
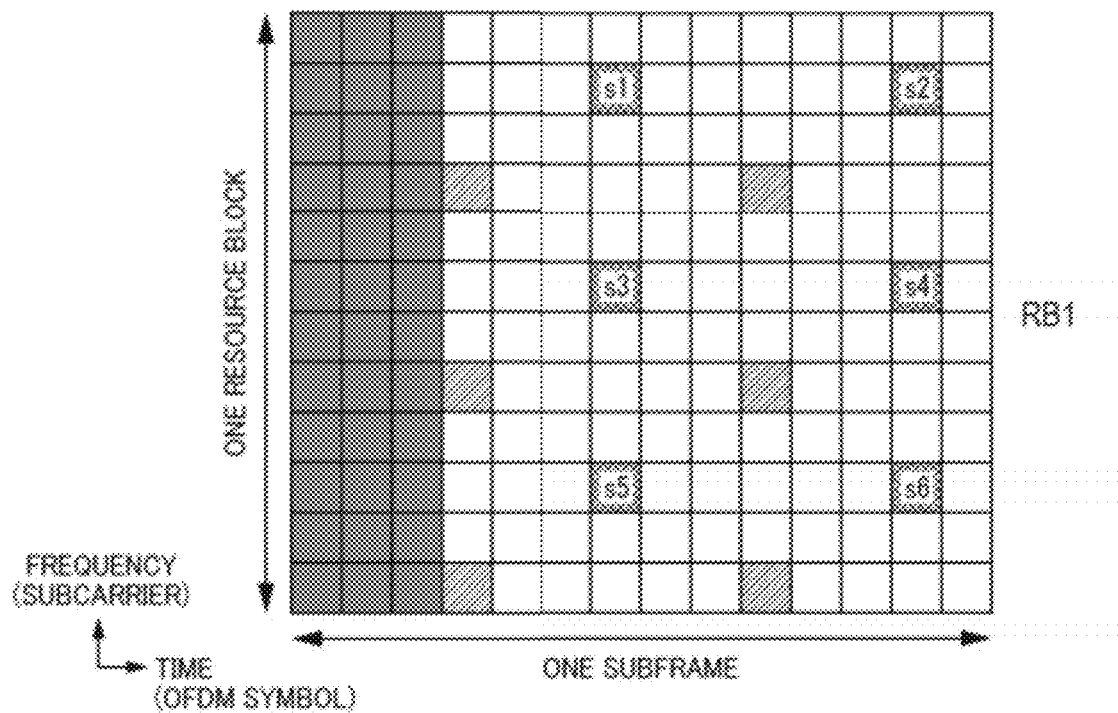
FIG. 5(a) and FIG. 5(b) are diagrams illustrating a method of superimposing reference signals and data signals based on another embodiment of the present invention.
Figure 5B:
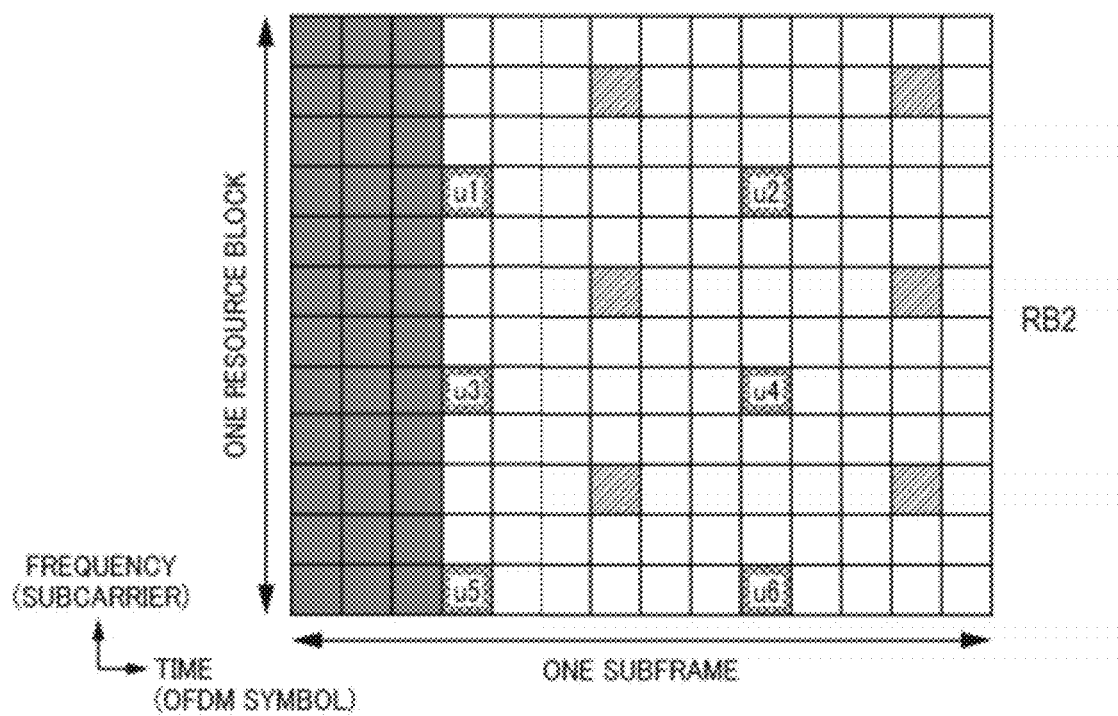

FIG. 5(a) and FIG. 5(b) are diagrams illustrating a method of superimposing reference signals and data signals based on another embodiment of the present invention.

Based on another embodiment of the present invention, it is possible to directly superimpose data signals at positions of first layer resource block RB1 corresponding to reference signals of a resource block of another layer (e.g., second layer resource block RB2). Here, as shown FIG. 5(a), data signals s1, s2, s3, s4, s5 and s6 are superimposed at positions of first layer resource block RB1 corresponding to positions of reference signals (resource elements shown by hatch lines) of second layer resource block RB2. Here, before the superimposition, there is no signal transmission at positions of first layer resource block RB1 corresponding to positions of reference signals of second layer resource block RB2, and therefore after the superimposition of the data signal, the terminal that receives the aforementioned resource block need not perform complicated calculations and can directly obtain the superimposed data signals. As shown in FIG. 5(a), when each layer transmits reference signals employing six resource elements, it is possible to superimpose further six data signals on first layer resource block RB1 using this method. The scheme of superimposing data signals based on this embodiment of the present invention drastically increases the resource block transmission efficiency.

As shown in FIG. 5(b), data signals u1, u2, u3, u4, u5 and u6 are superimposed at positions of second layer resource block RB2 corresponding to positions of the reference signals of first layer resource block RB1. Here, before the superimposition, there is no signal transmission at positions of second layer resource block RB2 corresponding to positions of reference signals of first layer resource block RB1, and therefore after the superimposition of data signals, the terminal that receives the aforementioned resource block need not perform complicated calculations and can directly obtain superimposed data signals. As shown in FIG. 5(b), when each layer transmits, reference signals employing six resource elements, it is possible to superimpose further six data signals on second layer resource block RB2 using this method. Similarly, the scheme of superimposing data signals based on this embodiment of the present invention drastically increases the resource block transmission efficiency.

The base station in the space division multiple access communication system based on the present embodiment transmits first layer resource block RB1 and the other layer resource block (e.g., second layer resource block RB2) to the terminal using the same time/frequency resources, and reference signals in first layer resource block RB1 are orthogonal to reference signals in the other layer resource block. Thus, the method of superimposing data signals and reference signals superimposes data signals transmitted in first layer resource block RB1 at positions of first layer resource block RB1 corresponding to positions of reference signals of the other layer resource block. Power allocation in the present embodiment is relatively simple. Since data signal formats are similar to each other, it is possible to allocate the same power to each data signal, increase the power of reference signals to above the power of data signals to a moderate level (e.g., 0.5 to 3 dB) and guarantee the quality of channel estimation.

Figure 6A:
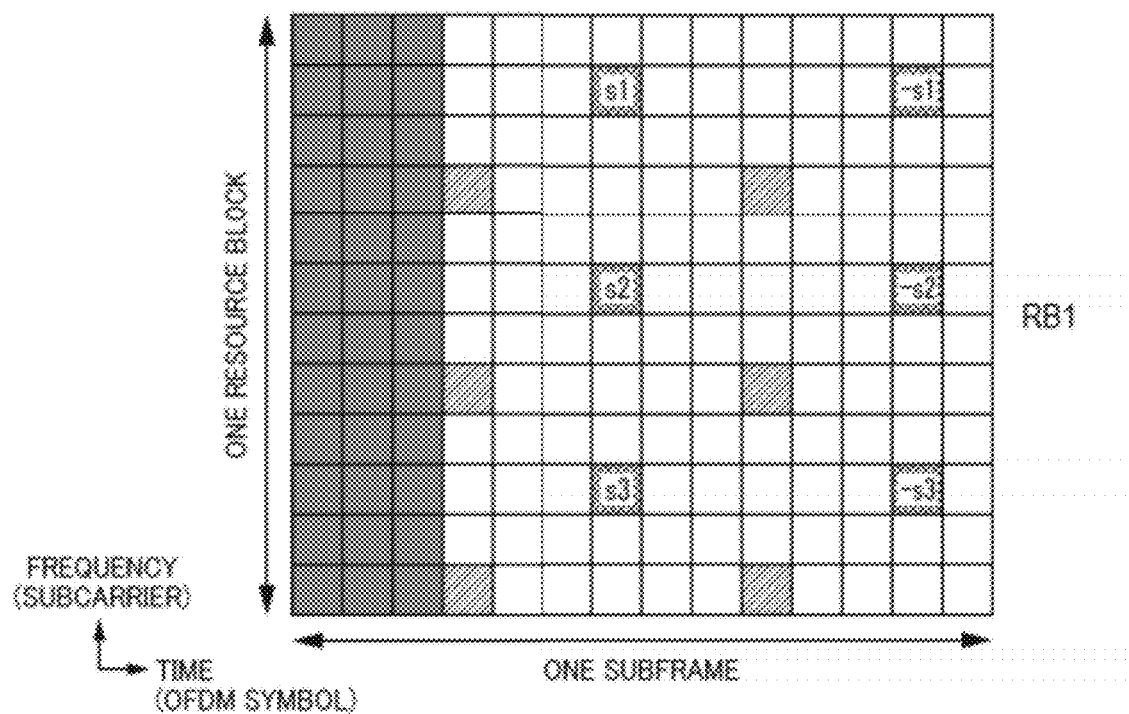
FIG. 6(a) and FIG. 6(b) are diagrams illustrating a method of superimposing reference signals and data signals based on a further embodiment of the present invention.
Figure 6B:
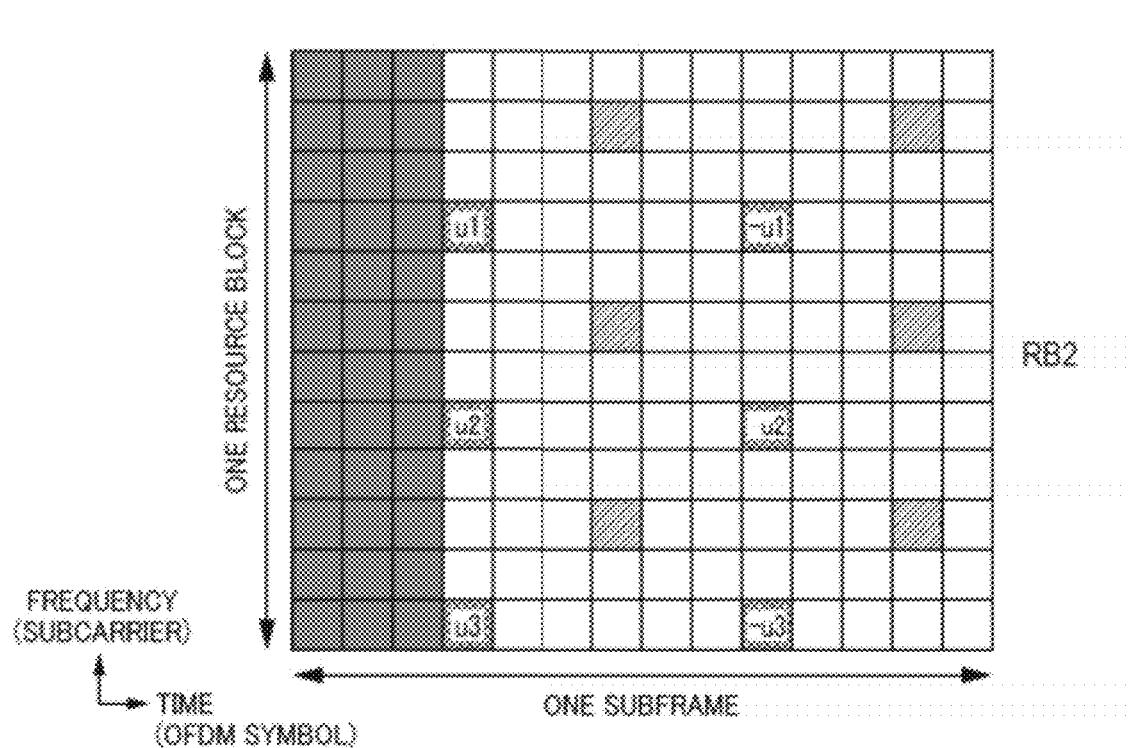

FIG. 6(a) and FIG. 6(b) are diagrams illustrating a method of superimposing reference signals and data signals based on a further embodiment of the present invention.

The embodiment shown in FIG. 6(a) and FIG. 6(b) is a further improvement of the embodiment shown in FIG. 5(a) and FIG. 5(b). To reduce interference between data signals superimposed on the resource block of the main layer (e.g., first layer) and reference signals of the other layer resource block (e.g., second layer), the spreading sequence of data signals superimposed at positions of the resource block in the main layer (e.g., first layer) corresponding to positions of reference signals of the other layer resource block is made to be orthogonal to the spreading sequence of reference signals of the other layer resource block (e.g., second layer). That is, the spreading sequence orthogonal to the spreading sequence of reference signals of the other layer resource block is employed for superimposed data signals.

As shown in FIG. 6(a), data signals s1, −s1, s2, −s2, s3 and −s3 are superimposed at positions on first layer resource block RB1 corresponding to reference signals of second layer resource block RB2. Here, the spreading sequence employed by reference signals of second layer resource block RB2 is [1,1,1,1,1,1] and data signals s1, s2 and s3 superimposed on first layer resource block RB1 employ spreading sequences [1, −1], [1, −1] and [1, −1] orthogonal thereto respectively. This allows data signals s1, −s1, s2, −s2, s3 and −s3 to be superimposed at corresponding positions of first layer resource block RB1 (see FIG. 6(a)). Thus, according to the embodiment in FIG. 6(a), three data signals can be superimposed. In addition to the above-described embodiment shown in FIG. 5(a), this makes it possible to further reduce interference between superimposed data signals and reference signals on the other layer resource block.

Similarly, as shown in FIG. 6(b), when [1,1,1,1,1,1] is employed as the spreading sequence of reference signals of first layer resource block RB1, [1,−1], [1,−1] and [1,−1] are employed as the spreading sequences orthogonal to data signals superimposed at positions on second layer resource block RB2 corresponding to the reference signals of first layer resource block RB1. This makes it possible to superimpose data signals u1, −u1, u2, −u2, u3 and −u3 at corresponding positions of second layer resource block RB2 (see FIG. 6(b)). Thus, according to the embodiment in FIG. 6(b), three data signals u1, u2 and u3 can be superimposed. In addition to the above-described embodiment shown in FIG. 5(b), this makes it possible to further reduce interference between superimposed data signals and reference signals on the other layer resource block.

Figure 7:
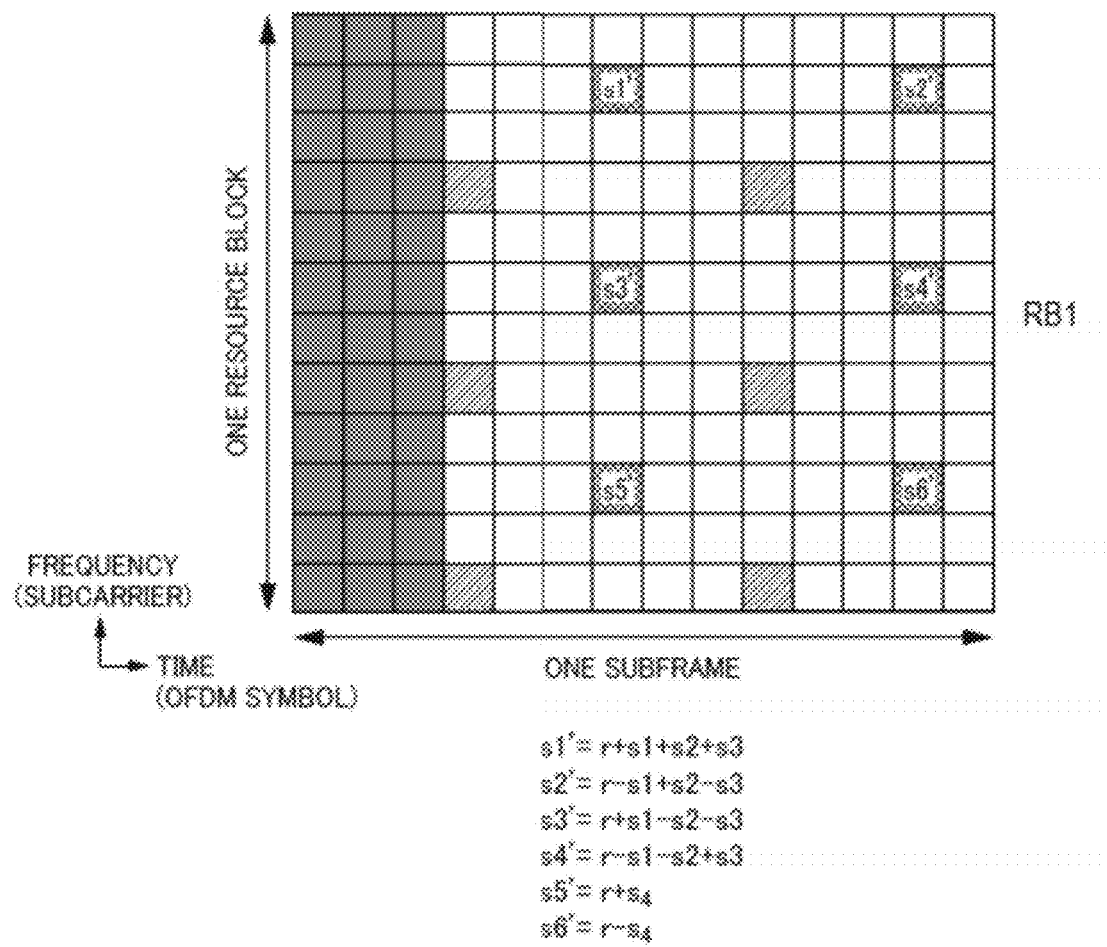
FIG. 7 is a diagram illustrating a method of superimposing reference signals and data signals based on a still further embodiment of the present invention.

FIG. 7 is a diagram illustrating a method of superimposing reference signals and data signals based on a still further embodiment of the present invention.

The embodiment shown in FIG. 7 is a further improvement of the embodiment shown in FIG. 6(a) and FIG. 6(b). Here, only first layer resource block RB1 will be described as an example. In order to superimpose more data signals on first layer resource block RB1 and reduce interference with reference signals on the resource block of the other layer (e.g., second layer), it is possible to spread data signals to be superimposed using a longer orthogonal spreading sequence. When the length of the spreading sequence is greater than 2, more pieces of data can be superimposed at the same time/frequency positions. As shown in FIG. 7, when [1,1,1,1,1,1] is employed for the spreading sequence of reference signals of second layer resource block RB2 and four data signals s1, s2, s3 and s4 are desired to be superimposed on first layer resource block RB1, orthogonal spreading sequences [1,−1, 1,−1],[1,1,−1,−1],[1,−1,−1,1] and [1,−1] can be employed for four data signals s1, s2, s3, s4 to be superimposed respectively on first layer resource block RB1. Thus, signals superimposed at corresponding position s1′, s2′, s3′, s4′, s5′ and s6′ of first layer resource block RB1 are r+s1+s2+S3, r−s1+s2−s3, r+s1−s2−s3, r−s1−s2+s3, r+s4 and r−s4 as shown in FIG. 7. Thus, according to the embodiment in FIG. 7, four data signals can be superimposed. Thus, it is easily understandable that more data signals can be superimposed when data signals to be superimposed employ a longer spreading sequence. By this means, in addition to the above-described embodiment shown in FIG. 6(a), it is possible to further increase the number of data signals superimposed and reduce interference between the data signals superimposed and reference signals on the other layer resource block.

Similarly, the present embodiment is also applicable to a situation in which data signals are superimposed in the resource block of the other layer (e.g., second layer).

Figure 8A:
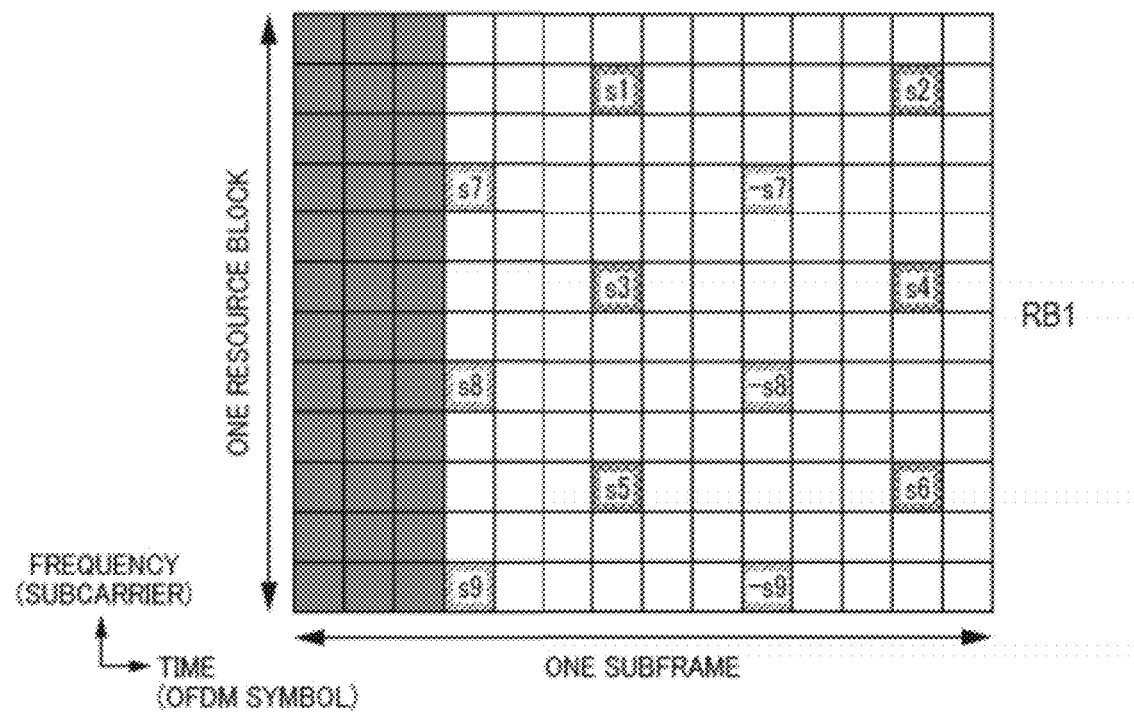
FIG. 8(a) and FIG. 8(b) are diagrams illustrating a method of superimposing reference signals and data signals based on a still further embodiment of the present invention.
Figure 8B:
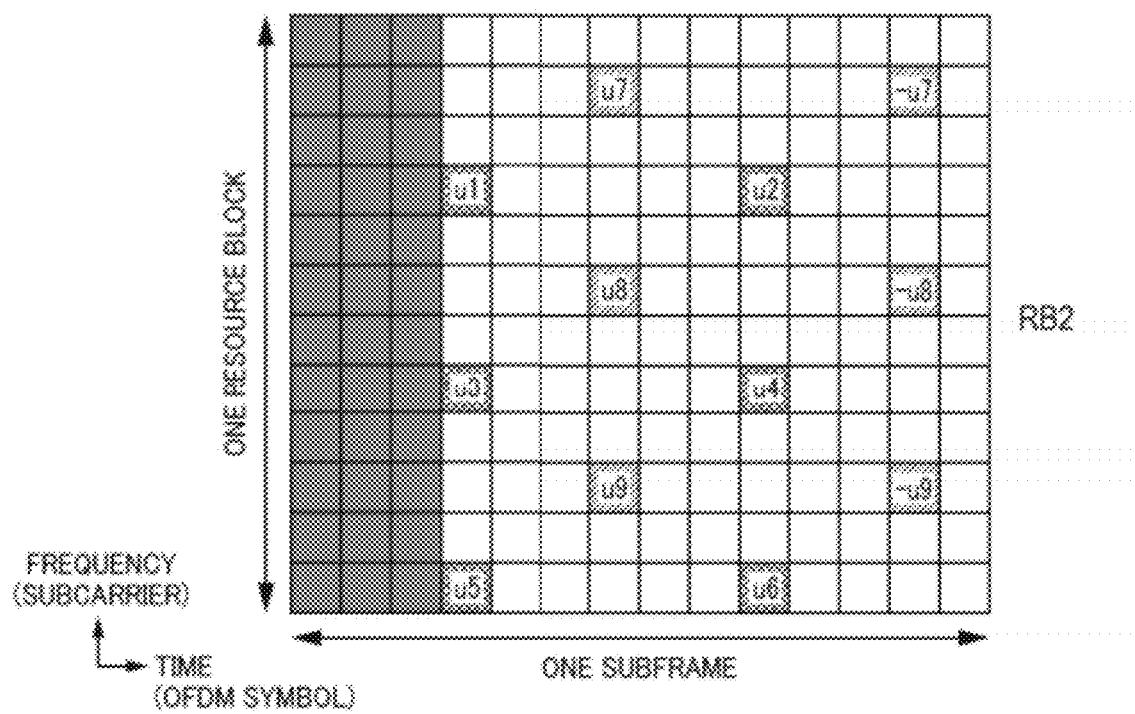

FIG. 8(a) and FIG. 8(b) are diagrams illustrating a method of superimposing reference signals and data signals based on a still further embodiment of the present invention.

The above-described embodiments can be combined based on a still further embodiment of the present invention. FIG. 8(a) shows an embodiment, which is a combination of the embodiments shown in FIG. 4(a) and FIG. 5(a). That is, data signals s1, s2, s3, s4, s5 and s6 are directly superimposed at positions of first layer resource block RB1 corresponding to reference signals of the other layer resource block (e.g., second layer resource block RB2), and more data signals s7, s8 and s9 are superimposed at positions of reference signals in first layer resource block RB1 and the spreading sequence of data signals s7, s8 and s9 superimposed at positions of reference signals in first layer resource block RB1 is made to be orthogonal to the spreading sequence of reference signals in first layer resource block RB1.

As shown in FIG. 8(a), when reference signals are transmitted by employing six resource elements in each layer, it is possible to superimpose nine data signals on first layer resource block RB1 using this method. The scheme of superimposing data signals based on this embodiment of the present invention drastically increases the resource block transmission efficiency.

In the present embodiment, six data signals are superimposed at positions corresponding to reference signals of the other layer (second layer) and other three data signals are superimposed on reference signals of the main layer (first layer). Since data signals superimposed on the main layer are spread through the orthogonal sequence, the power of data signals after every time of spreading can be reduced to below the power of the data signals superimposed on the other layer.

FIG. 8(b) shows a situation in which data signals u1, u2, u3, u4, u5 and u6 are directly superimposed at positions of second layer resource block RB2 corresponding to reference signals of the other layer resource block (e.g., first layer resource block RB1), and more data signals u7, u8 and u9 are superimposed at positions of reference signals in second layer resource block RB2, and the spreading sequence of data signals u7, u8 and u9 superimposed at positions of reference signals in second layer resource block RB2 is made to be orthogonal to the spreading sequence of reference signals in second layer resource block RB2.

Furthermore, it may be possible to use other combinations of the embodiments shown in FIG. 4(a), FIG. 5(a), FIG. 6(a) and FIG. 7 or other combinations of the embodiments shown in FIG. 4(b), FIG. 5(b), FIG. 6(b) and FIG. 7.

It is seen from above that data signals can be easily superimposed at positions corresponding to reference signals in the other layer through time division/frequency division multiplexing. When more pieces of data are desired to be superimposed, it is possible to superimpose data signals on reference signals of the main layer or superimpose more data signals at positions corresponding to reference signals of the other layer and at the same time spread data signals superimposed on reference signals using a different orthogonal spreading sequence.

Hereinafter, embodiments of the present invention in a situation in which reference signals employ a code division multiplexing scheme will be described by combining the attached drawings.

Figure 9:
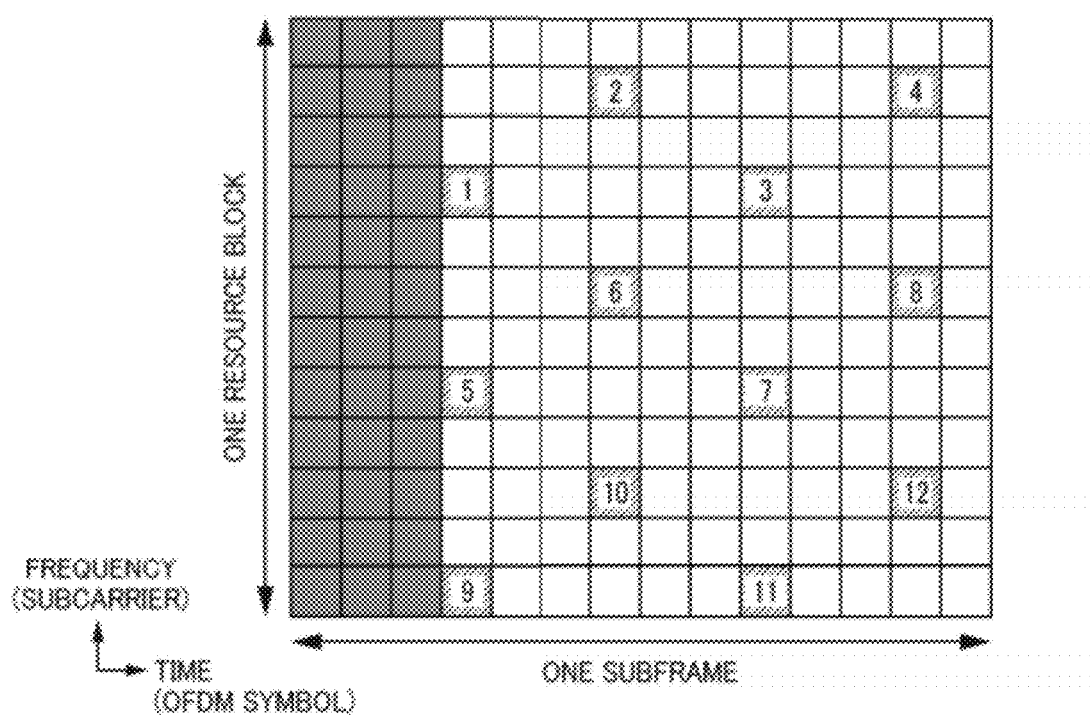
FIG. 9 is a diagram illustrating a resource block based on an embodiment of the present invention in a situation in which reference signals employ a code division multiplexing scheme.

FIG. 9 shows a resource block based on an embodiment of the present invention in a situation in which reference signals employ a code division multiplexing scheme.

In a situation employing a code division multiplexing scheme, since the structure of a resource block based on the embodiment of the present invention is completely the same as that of the resource block employing frequency division multiplexing or time division multiplexing, descriptions of the structure thereof will be omitted here. By contrast, when reference signals employ a code division multiplexing scheme, the reference signals can occupy similar time/frequency positions in a resource block of a different layer, but those resource blocks differ in that they use different orthogonal spreading sequences. That is, reference signals in first layer resource block RB1 and the resource block in the other layer (e.g., second layer) occupy similar time/frequency positions and use different orthogonal spreading sequences. As shown in FIG. 9, assuming that reference signals in first layer resource block RB1 occupy 12 resource elements (numbers 1 to 12 are used to indicate them), reference signals in second layer resource block RB2 also occupy 12 resource elements at the same positions as those in first layer resource block RB1. Furthermore, if applicable, reference signals in the other layer resource block also occupy 12 resource elements at the same positions as those in first layer resource block RB1. However, reference signals between, different layers are spread by employing mutually orthogonal spreading sequences and interference therebetween is minimized. Thus, it is seen that when the reference signals employ a code division multiplexing scheme, reference signals in first layer resource block RB1 and the other layer resource block occupy similar time/frequency positions and use different orthogonal spreading sequences.

When resource elements (RE) for transmitting reference signals are denoted using numbers 1 to 12 and it is assumed that reference signals (RS) are spread by employing a Hadamard-Walsh sequence therefor in each layer resource block, reference signals in second layer resource block RB2 employ a spreading sequence completely orthogonal to the spreading sequence of reference signals in first layer resource block RB1.

RE# 1 2 3 4 5 6 7 8 9 10 11 12
RS1 [1 1 1 1 1 1 1 1 1 1 1 1]
RS2 [1 −1 1 −1 1 −1 1 −1 1 −1 1 −1]

In the embodiment of the present invention, cell base station 200 of the communication system as shown in FIG. 2 transmits first layer resource block RB1 and the other layer resource block to a terminal that communicates therewith using the same time/frequency resources. For example, first layer resource block RB1 is transmitted to first user 201 and second layer resource block RB2 is transmitted to second user 202. Reference signals in first layer resource block RB1 and reference signals in the second layer (other layer) resource block are orthogonal to each other. The method of superimposing data signals and reference signals in a communication system based on the above-described space division multiple access superimposes data signals transmitted to first user 201 at positions of reference signals in first layer resource block RB1 and makes the spreading sequence of superimposed data signals orthogonal to the spreading sequence of reference signals in first layer resource block RB1.

Figure 10:
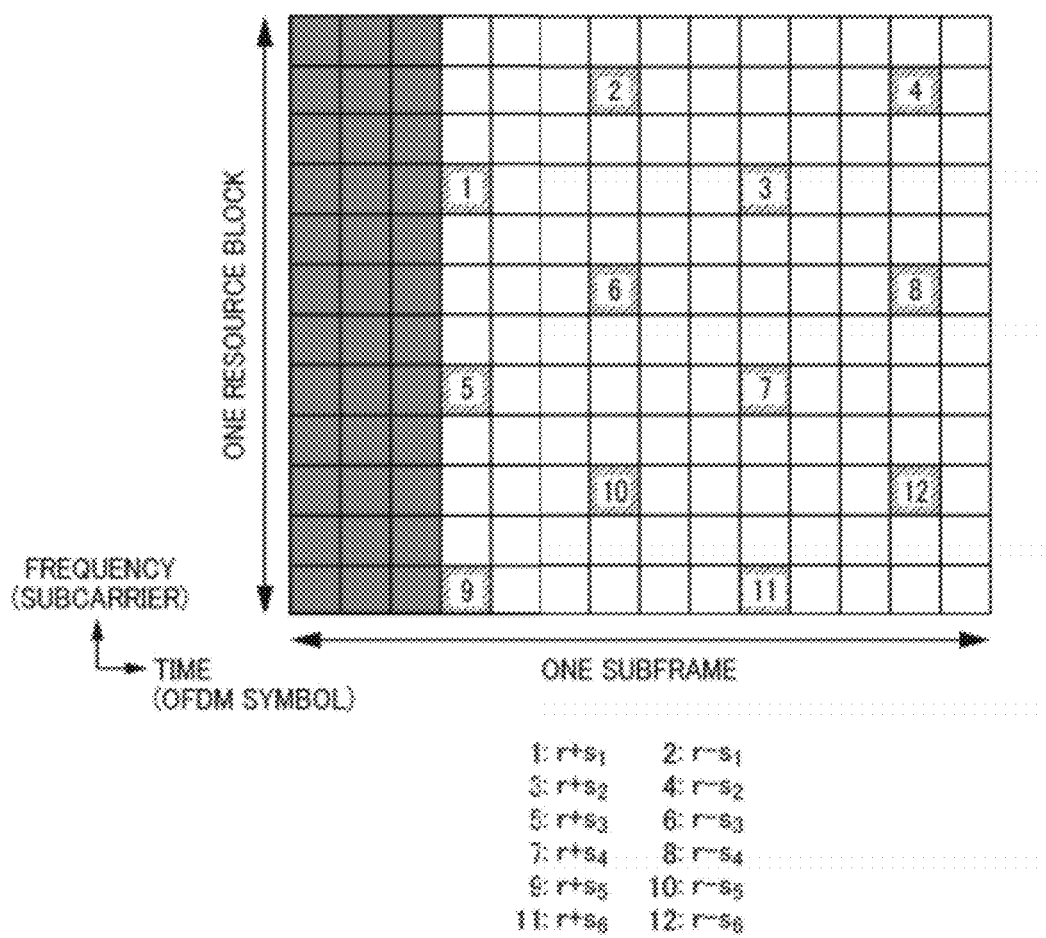
FIG. 10 is a diagram illustrating superimposition between reference signals and data signals based on the embodiment of the present invention in a situation in which reference signals employ a code division multiplexing scheme.

FIG. 10 shows superimposition between reference signals and data signals based on one embodiment of the present invention in a situation in which reference signals employ a code division multiplexing scheme.

With reference signals of code division multiplexing, the spreading sequence of superimposed data signals may be different from the spreading sequence of reference signals in the other layer resource block, but may also be the same as the spreading sequence of reference signals in the other layer resource block. The simplest method is a method whereby superimposed data signals use the same spreading sequence as the spreading sequence of reference signals in the other layer as shown below.

RE# 1 2 3 4 5 6 7 8 9 10 11 12
RS1 [1 1 1 1 1 1 1 1 1 1 1 1]
Data 1 [1 −1] [1 −1] [1 −1] [1 −1] [1 −1] [1 −1]
RE# 1 2 3 4 5 6 7 8 9 10 11 12
Data 2 [1 1] [1 1] [1 1] [1 1] [1 1] [1 1]
RS2 [1 −1 1 −1 1 −1 1 −1 1 −1 1 −1]

Here, data 1 represents data signals superimposed at positions of reference signals of first layer resource block RB1 and the orthogonal spreading sequence thereby used is the same as the orthogonal spreading sequence used by reference signals of second layer resource block RB2. Data 2 represents data signals superimposed at positions, of reference signals of second layer resource block RB2 and the orthogonal spreading sequence thereby used is the same as the orthogonal spreading sequence used by reference signals of first layer resource block RB1.

Based on the method of the present embodiment, further six data signals can be superimposed on the resource block of each layer. Here, both data 1 and data 2 use short spreading sequences and, they are, for example, [1,−1] and [ 1 , 1] respectively. As shown in FIG. 10, a reference signal of first layer resource block RB1 is represented by r, a superimposed data signal is represented by s# and six pieces of data s1 , s2, s3, s4, s5 and s6 are superimposed on reference signals of first layer resource block RB1. As described above, the spreading sequence of reference signal r is [1,1,1,1,1,1,1,1,1,1,1,1], the spreading sequences of data signals s1, s2, s3, s4, s5 and s6 are [1,−1], [1,−1], [1,−1],[1,−1], [1,−1] and [1,−1] respectively, signals superimposed at positions of 1 to 12 resource elements are r+s1, r−s1, r+s2, r−s2, r+s3, r−s3, r+s4, r−s4, r+s5, r−s5, r+s6 and r−s6 respectively.

Power allocation is relatively simple in the present embodiment. Since data signal formats are similar to each other, it is possible to allocate the same power to each data signal, increase the power of reference signals beyond the power of data signals to a moderate level (e.g., 0.5 to 3 dB) and guarantee the quality of channel estimation.

Figure 11:
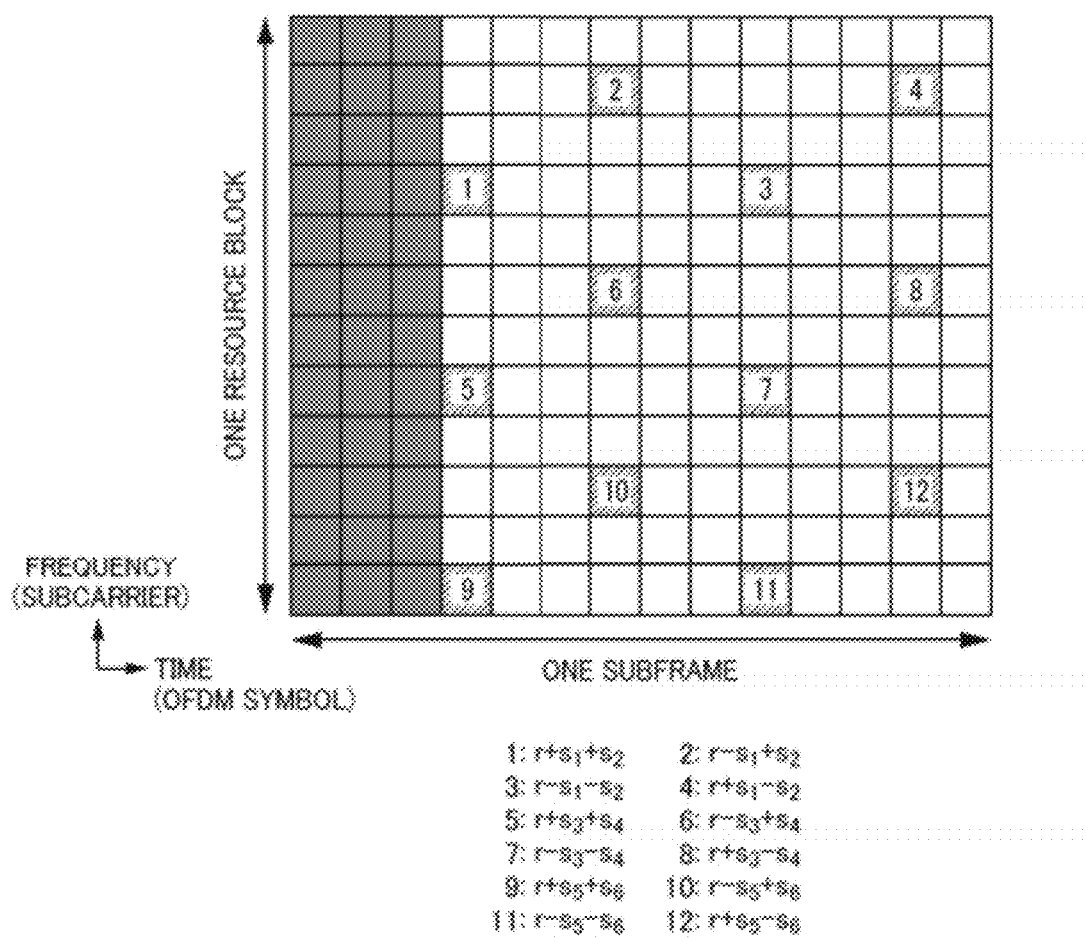
FIG. 11 is a diagram illustrating superimposition between reference signals and data signals based on another embodiment of the present invention in a situation in which reference signals employ a code division multiplexing scheme.

FIG. 11 shows superimposition between reference signals and data signals based on another embodiment of the present invention in a situation in which reference signals employ a code division multiplexing scheme.

Based on another embodiment of the present invention, it is also possible to make the spreading sequence of superimposed data signals orthogonal to the spreading sequence of reference signals in the other layer resource block. Here, the spreading sequence of superimposed data signals is a long spreading sequence and the long spreading sequence is made to be orthogonal to reference signals of resource blocks of two layers. For example, RE# 1 2 3 4 5 6 7 8 9 10 11 12
RS1 [1 1 1 1 1 1 1 1 1 1 1 1]
Empty [1 −1 1 −1 1 −1 −1 1 −1 1 −1]
Data 1 [1 −1 −1 1 ] [1 −1 −1 1 1 −1 −1 1]
Data 1' [1 −1 −1] [1 1 −1 −1] [1 −1 −1]
RE# 1 2 3 4 5 6 7 8 9 10 11 12
Empty [1 1] [1 1] [1 1] [1 1] [1 1] [1 1]
RS2 [1 −1 1 −1 1 −1 −1 1 −1 1 −1]
Data 2 [1 −1 −1 1] [1 −1 −1 1] [1 −1 −1 1]
Data 2' [1 1 −1 −1] [1 1 −1 −1] [1 1 −1 −1]

Here, data 1 and data 1' represent data signals superimposed at positions of reference signals of first layer resource block RB1 and long spreading sequences [1,−1,−1,1] and [1,1,−1,−1] thereby used and the spreading sequence used by reference signals of first layer resource block RB1 and second layer resource block RB2 are orthogonal to each other. Data 2 and data 2' represent data signals superimposed at positions of reference signals of second layer resource block RB2 and long spreading sequences [1, −1, −1, 1] and [1, 1, −1, −1] thereby used and the spreading sequence used by reference signals of first layer resource block RB1 and second layer resource block RB2 are orthogonal to each other. Based on the method of the present invention, it is possible to superimpose further six data signals on the resource block of each layer.

As shown in FIG. 11, assuming that a reference signal of first layer resource block RB1 is represented by r and a superimposed data signal is represented by s#, six pieces of data s1, s2, s3, s4, s5 and s6 are superimposed on reference signals of first layer resource block RB1. As described above, the spreading sequence of reference signal r is [1, 1, 1, 1, 1, 1, 1, 1, 1, 1, 1, 1], the spreading sequence of each signal in data signals s1, s3, s5 is [1, −1, −1, 1], the spreading sequence of each signal in data signals s2, s4, s6 is [1, 1, −1, −1], and signals superimposed at positions of 1 to 12 resource elements are r+s1+s2, r−s1+s2, r−s1−s2, r+s1−s2, r+s3+s4, r−s3+s4, r−s3−s4, r+s3−s4, r+s5+s6, r−s5+s6, r−s5−s6, r+s5−s6 respectively. Power allocation is relatively simple in the present embodiment. Since data signal formats are similar to each other, it is possible to allocate the same power to each data signal, increase the power of reference signals beyond the power of data signals to a moderate level (e.g., 0.5 to 3 dB) and guarantee the quality of channel estimation.

Figure 12:
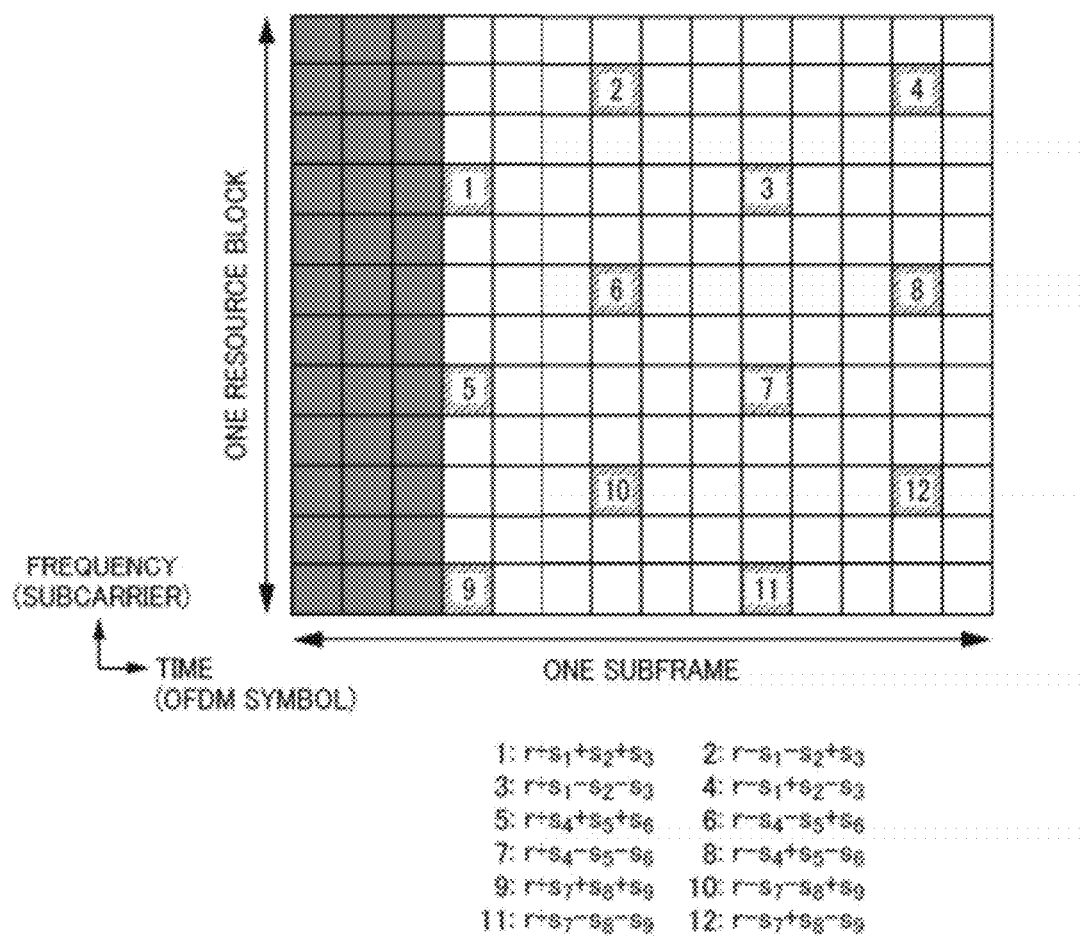
FIG. 12 is a diagram illustrating superimposition between reference signals and data signals based on a further embodiment of the present invention in a situation in which reference signals employ a code division multiplexing scheme.

FIG. 12 shows superimposition between reference signals and data signals based on another embodiment of the present invention in a situation in which reference signals employ a code division multiplexing scheme.

Based on another embodiment of the present invention, when more pieces of data are desired to be superimposed, it is also possible to spread data signals superimposed on reference signals of resource blocks of a plurality of layers (e.g., first layer and second layer) using the above-described long sequence when more pieces of data are desired to be superimposed based on another embodiment of the present invention, but this does nothing but guarantee orthogonality between superimposed data signals and reference signals of the main layer. In this case, the superimposed data signals can use the spreading sequence of reference signals of the other layer, for example, as follows.

RE# 1 2 3 4 5 6 7 8 9 10 11 12
RS1 [1 1 1 1 1 1 1 1 1 1 1 1]
Data 1 [1 −1 1 −1] [1 −1 1 −1] [1 −1 1 −1]
Data 1' [1 −1 −1 1] [1 −1 −1 1] [1 −1 −1 1]
Data 1" [1 1 −1 −1] [1 1 −1 −1] [1 1 −1 −1]
RE# 1 2 3 4 5 6 7 8 9 10 11 12
Data 2 [1 1 1 1] [1 1 1 1] [1 1 1 1]
RS2 [1 −1 1 −1 1 −1 1 −1 1 −1 1 −1]
Data 2' [1 −1 −1 1] [1 −1 −1 1] [1 −1 −1 1]
Data 2" [1 1 −1 −1] [1 1 −1 −1] [1 1 −1 −1]

Here, data 1, data 1' and data 1" represent data signals superimposed at positions of reference signals of first layer resource block RB1, and the long spreading sequence used by data 1 among them is the same as the spreading sequence used by reference signals of second layer resource block RB2. Data 2, data 2' and data 2" represent data signals superimposed at positions of reference signals of second layer resource block RB2, and the long spreading sequence used by data 2 among them is also the same as the spreading sequence used by reference signals of first layer resource block RB1. Based on the method of the present embodiment, further nine data signals can be superimposed on the resource block of each layer.

As shown in FIG. 12, assuming that a reference signal of first layer resource block RB1 is represented by r and a superimposed data signal is represented by s#, nine pieces of data s1, s2, s3, s4, s5, s6, s7, s8 and s9 are superimposed on reference signals of first layer resource block RB1. As described above, the spreading sequence of reference signal r is [1, 1, 1, 1, 1, 1, 1, 1, 1, 1, 1, 1], the spreading sequence of each signal in data signals s1, s4 and s7 is [1, −1, 1, −1], the spreading sequence of each signal in data signals s2, s5 and s8 is [1, −1, −1, 1], the spreading sequence of each signal in data signals s3, s6 and s9 is [1, 1, −1, −1] and signals superimposed at positions of 1 to 12 resource elements are r+s1+s2+s3, r−s1−s2+s3, r+s1−s2−s3, r−s1+s2−s3, r+s4+s5+s6, r−s4−s5+s6, r+s4−s5−s6, r−s4+s5−s6, r+s7+s8+s9, r−s7−s8+s9, r+s7−s8−s9 and r−s7+s8−s9 respectively.

Power allocation is also relatively simple in the present embodiment. Since data signal formats are similar to each other, it is possible to allocate the same power to each data signal, increase the power of reference signals beyond the power of data signals to a moderate level (e.g., 0.5 to 3 dB) and guarantee the quality of channel estimation.

Figure 13:
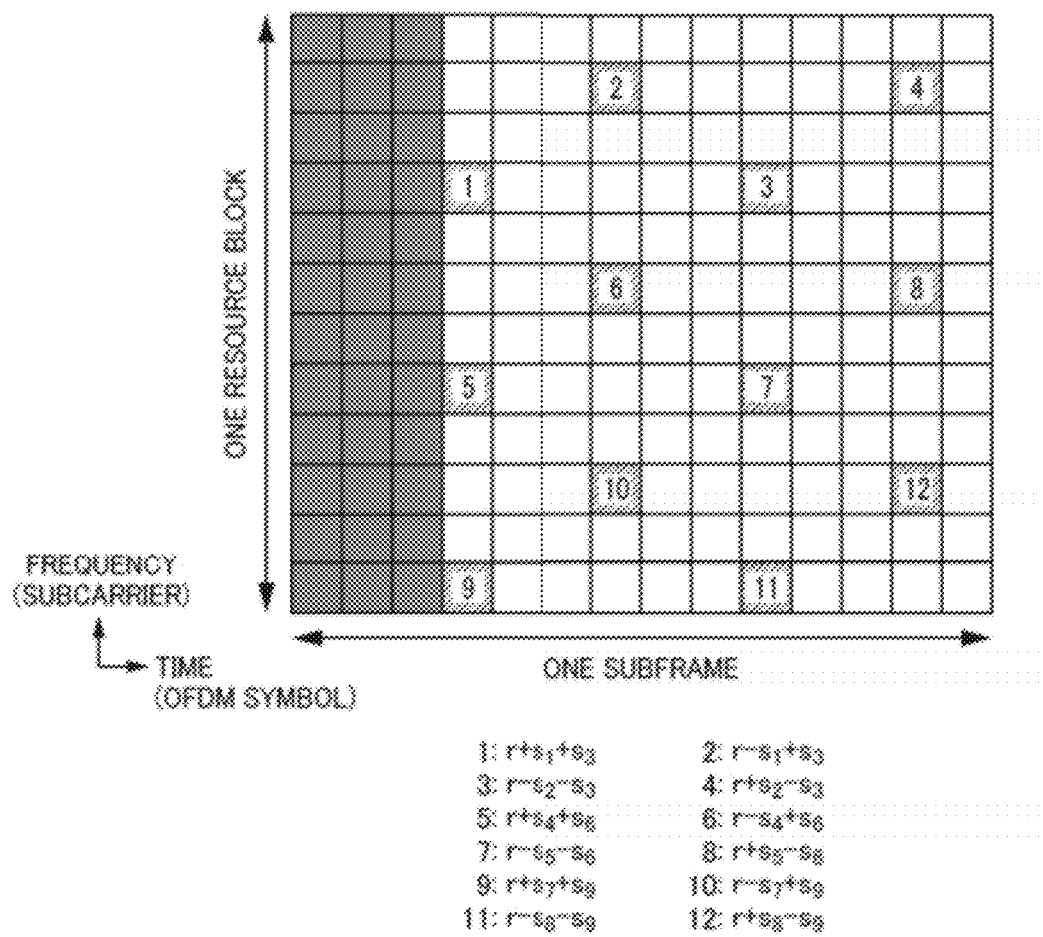
FIG. 13 is a diagram illustrating superimposition between reference signals and data signals based on a still further embodiment of the present invention in a situation in which reference signals employ a code division multiplexing scheme.

FIG. 13 shows superimposition between reference signals and data signals based on another embodiment of the present invention in a situation in which reference signals employ a code division multiplexing scheme.

Based on another embodiment of the present invention, it is possible to spread some superimposed data signals using a long spreading sequence and spread the other superimposed data signals using a short spreading sequence, and the long spreading sequence among them needs to be made orthogonal to the spreading sequences of reference signals in the resource blocks in the two layers and the short spreading sequence may be made orthogonal to only the spreading sequence of reference signals in the main layer. That is, the spreading sequence of superimposed data signals includes a long spreading sequence and a short spreading sequence, the long spreading sequence is orthogonal to both spreading sequences of reference signals in first layer resource block RB1 and second layer resource block RB2 and the short spreading sequence is orthogonal to only the spreading sequence of reference signals in first layer resource block RB1. For example, RE# 1 2 3 4 5 6 7 8 9 10 11 12
RS1 [1 1 1 1 1 1 1 1 1 1 1 1]
Empty [1 −1 1 −1 1 −1 1 −1 1 −1 1 −1]
Data 1' [1 −1] [−1 1] [1 −1] [−1 1] [1 −1] [−1 1]
Data 1" [1 1 −1 −1] [1 1 −1 −1] [1 1 −1 −1]
RE# 1 2 3 4 5 6 7 8 9 10 11 12
Empty [1 1 1 1 1 1 1 1 1 1 1 1]
RS2 [1 −1 1 −1 1 −1 1 −1 1 −1 1 −1]
Data 2' [1 −1 −1 1] [1 −1 −1 1] [1 −1 −1 1]
Data 2" [1 1] [−1 −1] [1 1] [−1 −1] [1 1] [−1 −1]

Here, data 1' and data 1" represent data signals superimposed at positions of reference signals of first layer resource block RB1, and data 1' among them uses the short spreading sequence and data 1" uses the long spreading sequence. The above-described long spreading sequence is orthogonal to the spreading sequences used by reference signals of the resource block of the main layer (first layer resource block RB1) and second layer resource block RB2, but the above-described short spreading sequence is orthogonal to only the spreading sequence used by reference signals of resource block RB1 of the main layer (first layer) and is not orthogonal to the spreading sequence used by reference signals of second layer resource block RB2. Data 2' and data 2" represent data signals superimposed at positions of reference signals of second layer resource block RB2, and data 2" among them uses a short spreading sequence and data 2' uses a long spreading sequence. The above-described long spreading sequence is orthogonal to the spreading sequences used by reference signals of the main layer (second layer resource block RB2) and first layer resource block RB1, but the above-described short spreading sequence is orthogonal to only the spreading sequence used by reference signals of resource block RB2 of the main layer (second layer) and is not orthogonal to the spreading sequence used by reference signals of first layer resource block RB1. Based on the method of the present embodiment, further nine data signals can be superimposed on the resource block of each layer.

As shown in FIG. 13, assuming that a reference signal of first layer resource block RB1 is represented by r and a superimposed data signal is represented by s#, nine pieces of data s1, s2, s3, s4, s5, s6, s7, s8 and s9 are superimposed on reference signals of first layer resource block RB1. As described above, the spreading sequence of reference signal r is [1, 1, 1, 1, 1, 1, 1, 1, 1, 1, 1, 1], the spreading sequence of each signal in data signals s1, s4 and s7 is [1, −1], the spreading sequence of each signal in data signals s2, s5 and s8 is [−1, 1], the spreading sequence of each signal in data signals s3, s6 and s9 is [1, 1, −1, −1] and signals superimposed at positions of 1 to 12 resource elements are r+s1+s3, r−s1+s3, r−s2−s3, r+s2−s3, r+s4+s6, r−s4+s6, r−s5−s6, r+s5−s6, r+s7+s9, r−s7+s9, r−s8−s9 and r+s8−s9 respectively.

In comparison with the method of the above-described embodiment, the method of the present embodiment can provide relatively good interference tolerant performance because interference received by reference signals originates from a plurality of different other layer data signals (generated by being spread with a short spreading sequence) and the interference diversity is relatively high.

In the present embodiment, some data signals are spread using a long spreading sequence and the power of these data signals after spreading can be lowered to a moderate level relative to the power of data signals spread using a short spreading sequence (e.g., 0 to 3 dB).

Based on another embodiment of the present invention, the spreading sequence of superimposed data signals includes a short spreading sequence, long spreading sequence and longer spreading sequence as shown below.

RE# 1 2 3 4 5 6 7 8 ... 16
RS1 [1 1 1 1 1 1 1 1]
Empty [1 −1 1 −1 1 −1 1 −1]
Data 1 [1 −1] [−1 1] [1 −1] [−1 1] [ ] [ ] [ ] [ ] [ ]
Data 1' [1 1 −1 −1] [1 1 −1 −1] [ ] [ ]
Data 1" [1 1 1 1 −1 −1 −1 −1] [ ]

Here, data 1, data 1' and data 1" represent data signals superimposed at positions of reference signals of first layer resource block RB1, and data 1 among them uses the short spreading sequence, data 1' uses the long spreading sequence and data 1" uses the longer spreading sequence. Each of the above-described spreading sequence is orthogonal to the spreading sequence used by reference signals of resource block RB1 of the main layer (first layer). As described above, when reference signals are transmitted using 16 resource elements for each layer, it is possible to superimpose further 14 data signals on each layer in the present embodiment.

In the present embodiment, the power of data signals spread using the longer spreading sequence can be lower than the power of data signals spread using the shorter spreading sequence. For example, the power allocated to data 1" can be lower than the power allocated to data 1' and the power allocated to data 1' can be lower than the power allocated to data 1.

The examples of the spreading sequence selected above are not intended to constitute limitations to the scope of the present invention, and other spreading sequences may be selected based on other embodiments of the present invention and not limited to the above-described situations as long as orthogonality between these spreading sequences is satisfied.

A situation has been described above by simply taking an example where signals are superimposed at positions of 1 to 12 resource elements of the first layer resource block and it is also possible to obtain a situation in which signals are superimposed at positions of 1 to 12 resource elements of the other layer (e.g., second layer) based on a similar method. Simultaneous transmission of reference signals at positions of 1 to 12 resource elements does not constitute limitations to the scope of the present invention either, but it is possible to implement a method of selecting resource elements at other positions of an arbitrary and appropriate quantity of resource blocks based on other embodiments of the present invention, transmit reference signals and superimpose data signals on reference signals based on the present invention.

Figure 14:
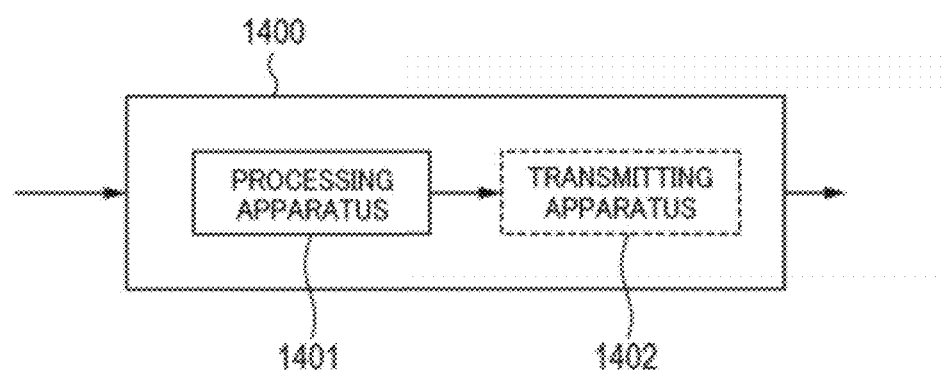
FIG. 14 is a diagram illustrating an apparatus based on an embodiment of the present invention.

FIG. 14 is a diagram illustrating an apparatus based on an embodiment of the present invention.

As shown in FIG. 14, apparatus 1400 based on an embodiment of the present invention is arranged in a cell base station (e.g., cell base stations 100 and 200 shown in FIG. 1 and FIG. 2) in a communication system, the communication system is a communication system based on space division multiple access, the cell base station includes a plurality of antennas, which are used to transmit signals to a user based on space division multiplexing. Apparatus 1400 includes processing apparatus 1401 used to superimpose data signals transmitted in first layer resource block RB1 at positions of reference signals in first layer resource block RB1 and make the spreading sequence of superimposed data signals orthogonal to the spreading sequence of reference signals in first layer resource block RB1. Furthermore, apparatus 1400 may also include transmitting apparatus 1402 used to transmit first layer resource block RB1 in which data signals and reference signals are superimposed for the communicating terminal and the other layer resource block using the same time/frequency resources, and reference signals in first layer resource block RB1 and reference signals in the other layer resource block are orthogonal to each other.

Based on another embodiment of the present invention, above-described transmitting apparatus 1402 may be included in the cell base station, connected so as to be only operable with above-described processing apparatus 1401 and allowed to complete data transmission operation.

As described above, there are different data superimposition schemes based on different orthogonal schemes (time division/frequency division, code division). Time divide/frequency division allows data signals and reference signals in the other layer to be simply superimposed. When more pieces of data are desired to be superimposed, data signals may be superimposed on reference signals of the main layer and signals may be spread using different orthogonal spreading sequences for reference signals in the main layer and data signals. In code division multiplexing, it is possible to easily specify so that superimposed data signals use a spreading sequence orthogonal to reference signals in the main layer, but the spreading sequence may be the same as the spreading sequence of reference signals in the other layer. Furthermore, another method spreads data signals to be superimposed on reference signals in two layers using a long sequence and guarantees that superimposed data signals are orthogonal to reference signals in the two layers.

When more pieces of data are desired to be superimposed in code division multiplexing, data signals to be superimposed on reference signals in the two layers may be spread using a long spreading sequence. In this case, only guaranteeing orthogonality between superimposed data signals and reference signals in the main layer allows the superimposed data signals to use the spreading sequence of reference signals in the other layer. Furthermore, as another method, several superimposed data signals use a long spreading sequence and the other data use a short spreading sequence. The long spreading sequence is orthogonal to reference signals in the two layers and the short spreading sequence is orthogonal to only reference signals in the main layer. In contrast to the first method, in the second method, interference received by reference signals originates from a plurality of different other layer data signals and diversity of the interference is relatively high and it is thereby possible to provide a relatively good interference tolerant performance.

Those skilled in the art may be able to understand the following. The present invention is not limited to the framework of conventional 3GPP LTE-A but can be applied under various different backgrounds, and the technological solving means of the present invention can be applied when, for example, the number of transmission layers is greater than 2 or when interference between the respective layers is relatively small in single user transmission or when different pieces of data or reference signals are superimposed on each other. That is, the respective embodiments of the present invention show two user terminals, but the present invention is not limited to two user terminals, and user terminals based on the present invention may be a plurality of terminals and resource blocks received by each terminal may be resource blocks of different layers. When interference between the respective layers is relatively small, the user terminal based on the present invention may be one terminal and the one terminal may receive resource blocks of different layers.

Although a case has been described in the embodiments of the present invention where a Hadamard-Walsh sequence is used as the spreading sequence, other orthogonal or quasi-orthogonal sequences may also be used as the spreading sequence. Although a case has been described in the embodiments of the present invention where data signals are superimposed in association with all reference signals of a resource block, time domain/frequency domain/code domain resources of all reference signals need not be used based on the other embodiments of the present invention, but some reference signal resources may be used, that is, data signals may be superimposed only on some reference signals or at positions corresponding thereto.

Furthermore, the same modulation scheme need not be used for superimposed data signals and other data signals, but different modulation schemes may be used therefor.

The respective embodiments in the present application are nothing more than descriptions as illustrative examples and specific configurations and operations of the respective embodiments do not limit the scope of the present invention and those skilled in the art can create a new implementation scheme by combining different parts and operations in the above-described embodiments, and this also likewise conforms to the thought of the present invention.

The embodiments of the present invention are implemented by hardware, software, firmware and a scheme combining them, but the implementation scheme does not limit the scope of the present invention. Connection relationships between function elements (sections) in the embodiments of the present publication are not intended to limit the scope of the present publication and one or a plurality of elements thereof may include other arbitrary function elements or may be connected to other arbitrary function elements.

Some embodiments of the present publication have been presented and described by combining the attached drawings and it is self-evident to those skilled in the art that changes and modifications may be made to these embodiments without departing from the principles and spirit of the present invention and these changes and modifications still fall within the scope of claims of the present publication and the scope of equivalents thereof.

The invention claimed is:

1. A method of superimposing data signals and reference signals in a space division multiple access communication system, a base station of the communication system transmitting a first layer vsource block and another layer resource block to a terminal using the same time/frequency resources, reference signals in the first layer resource block and reference signals in the other layer resource block being orthogonal to each other, the method comprising:
    superimposing data signals transmitted in the first layer resource block at positions of reference signals in the first layer resource block and making a spreading sequence of superimposed data signals orthogonal to a spreading sequence of the reference signals in the first layer resource block.

2. The method according to claim 1, wherein the reference signals employ a code division multiplexing scheme, and the reference signals in the first layer resource block and the reference signals in the other layer resource block occupy the same time/frequency position and use different orthogonal spreading sequences.

3. The method according to claim 2, wherein the spreading sequence of the superimposed data signals is the same as the spreading sequence of the reference signals in the other layer resource block.

4. The method according to claim 2, wherein the spreading sequence of the superimposed data signals is orthogonal to the spreading sequence of the reference signals in the other layer resource block.

5. The method according to claim 2, wherein the spreading sequence of the superimposed data signals includes a long spreading sequence and a short spreading sequence, the long spreading sequence is orthogonal to the spreading sequence of the reference signals in the first layer resource block and the other layer resource block, and the short spreading sequence is orthogonal to only the spreading sequence of the reference signals in the first layer resource block.

6. The method according to claim 1, wherein the same power is allocated to each data signal and relatively high power is allocated to each reference signal.

7. The method according to claim 1, wherein the spreading sequence of superimposed data signals includes a short spreading sequence, a long spreading sequence and a longer spreading sequence.

8. The method according to claim 7, wherein power of data signals spread using the relatively long spreading sequence is lower than the power of data signals spread using the relatively short spreading sequence.

9. The method according to claim 1, wherein the spreading sequence is a Hadamard-Walsh sequence.

10. The method according to claim 1, wherein the terminal is a plurality of terminals and resource blocks received by different terminals are resource blocks of different layers.

11. The method according to claim 1, wherein the terminal is one terminal and the one terminal receives resource blocks of different layers.

12. The method according to claim 1, wherein the reference signals employ a frequency division multiplexing or time division multiplexing scheme and the method further comprises a step of superimposing data signals at positions of the first layer resource block corresponding to reference signals of the other layer resource block.

13. The method according to claim 12, wherein data signals superimposed at positions of the first layer resource block corresponding to reference signals of the other layer resource block employs a spreading sequence orthogonal to a spreading sequence of reference signals of the other layer resource block.

14. The method according to claim 13, wherein when a length of a spreading sequence is greater than 2, a plurality of pieces of data can be superimposed at the same time/frequency positions of the first layer resource block.

15. An apparatus that superimposes data signals and reference signals in a space division multiple access communication system, the apparatus being arranged in a cell base station, comprising:
    a superimposing apparatus that superimposes data signals transmitted in a first layer resource block at positions of reference signals in the first layer resource block and makes a spreading sequence of the superimposed data signals orthogonal to a spreading sequence of reference signals in the first layer resource block, wherein:
    the cell base station transmits the first layer resource block and another layer resource block to a terminal using time/frequency resources.

16. A method of superimposing data signals and reference signals in a space division multiple access communication system, a base station of the communication system transmitting a first layer resource block and another layer resource block to a terminal using the same time/frequency resources, reference signals in the first layer resource block being orthogonal to reference signals in the other layer resource block, the method comprising:
    superimposing data signals transmitted in the first layer resource block at positions of the first layer resource block corresponding to positions of reference of the other layer resource block,
    the superimposed data signals employing a spreading sequence orthogonal to the spreading sequence of reference signals of the other layer resource block.

17. The method according to claim 16, wherein when a length of the spreading sequence is greater than 2, a plurality of pieces of data can be superimposed at the same time/frequency positions.

* * * * *